(12) United States Patent
Winzinger et al.

(10) Patent No.: US 12,049,366 B2
(45) Date of Patent: Jul. 30, 2024

(54) DEVICE AND METHOD FOR TRANSPORTING OBJECTS

(71) Applicant: KRONES AG, Neutraubling (DE)

(72) Inventors: Frank Winzinger, Regensberg (DE); Wolfgang Roidl, Deuerling (DE); Michael Neubauer, Grassau (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/769,199

(22) PCT Filed: Oct. 1, 2020

(86) PCT No.: PCT/EP2020/077520
§ 371 (c)(1),
(2) Date: Apr. 14, 2022

(87) PCT Pub. No.: WO2021/073886
PCT Pub. Date: Apr. 22, 2021

(65) Prior Publication Data
US 2024/0010442 A1  Jan. 11, 2024

(30) Foreign Application Priority Data

Oct. 17, 2019  (DE) .......................... 102019127998.4

(51) Int. Cl.
| | | |
|---|---|---|
| *B65G 47/252* | (2006.01) | |
| *B01F 33/501* | (2022.01) | |
| *B01F 35/42* | (2022.01) | |
| *B08B 9/08* | (2006.01) | |
| *B65G 54/02* | (2006.01) | |

(52) U.S. Cl.
CPC ........ *B65G 47/252* (2013.01); *B01F 33/5013* (2022.01); *B01F 35/42* (2022.01);
(Continued)

(58) Field of Classification Search
CPC .................. B65G 47/252; B65G 54/02; B65G 2201/0247; B65G 47/842; B65G 47/248;
(Continued)

(56) References Cited

U.S. PATENT DOCUMENTS

| | | | | |
|---|---|---|---|---|
| 5,253,910 A | * | 10/1993 | Perrier ................... | B65G 47/90 294/115 |
| 5,277,207 A | * | 1/1994 | Perrier ..................... | B08B 9/32 134/182 |

(Continued)

FOREIGN PATENT DOCUMENTS

| | | |
|---|---|---|
| CN | 102281970 A | 12/2011 |
| CN | 205187279 U | 4/2016 |

(Continued)

OTHER PUBLICATIONS

International Search Report for corresponding PCT Application No. PCT/EP2020/077520 dated Dec. 9, 2020.

(Continued)

*Primary Examiner* — Mark A Deuble
(74) *Attorney, Agent, or Firm* — Caesar Rivise, PC

(57) ABSTRACT

The invention relates, inter alia, to a device for transporting objects. The device has a guide track and at least one movement device having a main body and a bracket for holding an object. The bracket is connected to the main body pivotably about a pivot axis, and the pivot axis is oriented at an angle to a vertical axis of the at least one movement device. A pivoting device is arranged separately from the at least one movement device and is designed to cause the bracket to pivot about the pivot axis. The device makes it possible for different handling devices with differing requirements on an orientation of the object to be able to be (Continued)

run with just one movement device without it being necessary, in the meantime, to hand the object over from the movement device.

19 Claims, 7 Drawing Sheets

(52) U.S. Cl.
CPC ............ *B08B 9/0821* (2013.01); *B65G 54/02* (2013.01); *B08B 2209/08* (2013.01); *B65G 2201/0247* (2013.01)

(58) Field of Classification Search
CPC .......... B65G 47/901; B65G 2201/0244; B01F 33/5013; B01F 35/42; B08B 9/0821; B08B 2209/08
See application file for complete search history.

(56) References Cited

U.S. PATENT DOCUMENTS

| | | |
|---|---|---|
| 6,945,260 B1 | 9/2005 | Stocchi et al. |
| 8,985,309 B2 * | 3/2015 | Drenguis ................ B08B 9/205 198/406 |
| 2022/0119206 A1 * | 4/2022 | Bonnain ................ B65G 43/08 |

FOREIGN PATENT DOCUMENTS

| | | |
|---|---|---|
| DE | 60022518 T2 | 6/2006 |
| DE | 202006010368 U1 | 11/2007 |
| DE | 102013212377 A1 | 12/2014 |
| DE | 102014102116 A1 | 8/2015 |
| DE | 102014104905 A1 | 10/2015 |
| DE | 102016109435 A1 | 11/2017 |
| DE | 102017201310 A1 | 8/2018 |
| EP | 1123886 A1 | 8/2001 |
| WO | WO2010095575 A2 | 8/2010 |
| WO | WO2014/108287 A1 | 7/2014 |

OTHER PUBLICATIONS

English abstract of DE102014102116A1.
English abstract of DE102013212377A1.
English abstract of DE102016109435A1.
English abstract of DE102014104905A1.
English abstract of EP1123886A1.

* cited by examiner

DEVICE AND METHOD FOR TRANSPORTING OBJECTS

CROSS-REFERENCE TO RELATED APPLICATIONS

This application is a U.S. National Phase Application under 35 U.S.C. § 371 of PCT/EP2020/077520, filed Oct. 1, 2020, which claims priority from German Patent Application No. 10 2019 127 998.4, filed Oct. 17, 2019, the contents of which applications are incorporated herein by reference in their entireties.

TECHNICAL FIELD

The invention relates to an apparatus and a method for transporting objects, preferably containers for a container processing installation.

TECHNICAL BACKGROUND

A container processing installation may comprise various container processing apparatuses which in order to process the containers require different orientations of the containers. For example, a rinsing device for rinsing or flushing containers may require an inverted orientation, whilst a filling device for filling containers may require an upright orientation of the containers.

Some apparatuses by means of which an orientation of an object during transport can be changed as desired are already known from the prior art.

EP 1 123 886 B1 discloses an apparatus for transporting products along a working path. The apparatus has a guide which is constructed as a closed loop and on which a plurality of conveyor elements for receiving the products are movably guided. On the guide, a large number of coils which are arranged one behind the other and which are controlled separately are arranged and each conveyor element has at least one permanent magnet which in combination with the coils forms a linear motor. Each conveyor element comprises a carriage which is displaceably guided on the guide and a transport element for the products which is movably supported on the carriage. The movement of the transport element relative to the carriage is controlled by control means. The transport element can be pivoted about a vertical axis which extends transversely relative to the transport direction of the carriage.

DE 10 2014 102 116 A1 discloses an apparatus for flushing and sterilising containers in a drinks filling installation. In one embodiment, container holders which hold the containers at the neck portion thereof are guided by means of a magnetic tubular direct drive along a carousel. The container holders have a portion which is constructed as a magnetic rotor which is arranged around a stator. As a result of an individual corresponding application of current to each rotor, a pivoting of the container holder about the stator can be carried out in order to change an orientation of the container retained by the container holder.

Other prior art relating to the technological background is disclosed, for example, in DE 600 22 518 T2 and DE 10 2017 201 310 A1.

An object of the invention is to provide an alternative and/or improved technology for pivoting objects, in particular containers.

SUMMARY OF THE INVENTION

The object is achieved by the features of the independent claims. Advantageous developments are set out in the dependent claims and the description.

The invention provides an apparatus for transporting objects, preferably containers (for example, bottles, in particular PET bottles or glass bottles, cans and/or other containers) for a container processing installation (for example, for producing, cleaning, checking, filling, closing, labelling, printing and/or packaging containers for liquid media, preferably drinks or liquid foodstuffs). The apparatus has a (for example, closed or circumferential) guide path (for example, guide rail, guiding groove or guiding rolling path). The apparatus has at least one movement apparatus, preferably a plurality of movement apparatuses. The at least one movement apparatus has a base member. The base member is guided (for example, in a transport direction) along the guide path and can be individually driven (moved) (for example, independently of other movement apparatuses). The at least one movement apparatus has a holder for retaining an object (for example, a product), preferably a container (for example, container neck holder) (for example, pretensioned holder, mandrel, gripper, etcetera). The holder is connected to the base member so as to be able to be pivoted about a pivot axis. The pivot axis is orientated so as to be angled (for example, skewed and/or at an angle in a range between 1° and 90°) with respect to an upright axis (for example, vertical centre axis or parallel therewith) of the at least one movement apparatus. The apparatus has a pivot device. The pivot device is arranged separately from the at least one movement apparatus and is constructed to bring about a pivoting of the holder about the pivot axis.

Using only one movement apparatus, the apparatus enables various processing apparatuses with different requirements relating to an orientation of the object to be able to be passed through without the object having to be transferred from the movement apparatus in the meantime. The pivoting operation which is enabled in this manner can consequently facilitate the implementation of specific process steps on the object without having to remove the object from the movement apparatus. This may, for example, be a rinsing operation, in which a container is intended to be inverted so that the rinsing medium can be discharged. Alternatively, for example, a turning of a container for mixing components which are introduced one after the other is also conceivable. A single or multiple pivoting mixes the contents in the container.

Preferably, the upright axis may be orientated vertically or may be a vertical axis. It is possible for an extension of the upright axis to intersect the earth's centre with a vertical orientation of the movement apparatus.

In one embodiment, the pivot axis is orientated in such a manner that the object which is retained in the holder can be pivoted into an inverted state. Consequently, for example, a rinsing operation for rinsing the container or a blowing operation for producing the container can be facilitated or a mixing operation for contents in the container can be improved.

Preferably, a rinsing operation may, for example, involve cleaning with a cleaning fluid or rinsing preferably with sterilised water.

In another embodiment, the pivot axis is constructed to pivot the holder at a pivot angle in the range between 1° and 360°, preferably through 180°. Consequently, for example an upright position and an inverted position of the container can be achieved.

Advantageously, the term "inverted" or "inverted position" used herein may relate to an orientation of the object in which an upper portion (head portion) of the object is orientated downwards. The upright axis of the object may in this instance, for example, extend parallel at an angle with respect to a vertical axis. It is possible that in the case of an "inverted position" in the presence of a (for example, pouring) opening (for example, in drinks containers such as bottles), this position is arranged substantially at the bottom (relative to the remainder of the container) or is directed downwards.

In another embodiment, the holder can be pivoted about the pivot axis between a basic position and a pivoted-out position, preferably an inverted pivoted-out position. The basic position and the pivoted-out position may be stable positions in which the holder can be retained with further external influence. It is possible for the holder to be able to be pivoted only between the basic position and the pivoted-out position.

In one embodiment, the pivot device is fixed with respect to the guide path. For example, the pivot device may be secured to the guide path or the pivot device and the guide path are fixed to a common frame.

In another embodiment, the pivot device is constructed to pivot the holder during a stoppage of the respective movement apparatus or during a movement of the respective movement apparatus along the guide path. Thus, depending on possibilities and requirements, a pivoting of the holder and consequently of the object can be achieved.

It is possible for the apparatus to have a control unit which is constructed to coordinate the apparatus of a stoppage or standstill of the movement apparatus and a pivoting by the pivot device. For example, the control unit may have an electronic control unit (for example, with a microprocessor and memory) and/or a mechanical control unit (for example, by means of cams and/or levers) and/or a pneumatic control unit. In the case of an electronic control unit, for example, at least one sensor may detect a position of the movement apparatus and a stoppage of the movement apparatus and may transmit a corresponding signal to the control unit. Based on this signal, the control unit can subsequently activate the pivot device or a drive of the pivot device.

In a development, for example, the sensor may use a track of a long stator linear drive in which there are provided for position detection magnets which cooperate with other magnets provided on the movement apparatus.

Advantageously, the holder of the same movement apparatus may be pivoted both during stoppage and during a movement along the guide path, depending on the embodiment of the pivot device. Consequently, it is possible to be flexible with different requirements with regard to the pivot device within an installation or in different installations.

In another embodiment, the at least one movement apparatus has a connection element. The connection element can be connected to the pivot device (for example, in a contacting or contact-free manner) and connected to the holder (for example, physically) (for example, secured to the holder and/or the pivot axis). The connection element is constructed to bring about a pivot movement of the holder under the action of the pivot device. Consequently, the connection element enables selective coupling to the pivot device, if desired.

In a development, the connection element of the at least one movement apparatus can be pivoted about the pivot axis of the holder. Consequently, in a simple manner, a pivoting of the connection element by the pivot device can be converted into a pivoting of the holder and consequently of the object.

In another embodiment, the connection element of the at least one movement apparatus is in the form of a guiding element, preferably a rotatable roller, a sliding block, a guiding pin, a guiding plate or a guiding groove. Consequently, the connection element can be brought into engagement in a simple manner with a correspondingly adapted connection element (counter-piece) of the pivot device in order to begin the pivot operation.

In a variant, a connection element of the pivot device which can be connected to the connection element of the at least one movement apparatus (for example, brought into engagement) can preferably be moved in a translational manner and/or transversely relative to the guide path and/or by means of a linear drive in order to move into contact and out of contact with the connection element of the at least one movement apparatus.

In another variant, the pivot device has a slotted guiding member, in which the connection element of the at least one movement apparatus can be guided and whose progressive form brings about a pivoting of the connection element of the at least one movement apparatus, preferably about the pivot axis. Consequently, in a simple manner, the holder and the retained object can be pivoted whilst the movement apparatus moves along the guide path.

It is possible for the above-mentioned sensor, for example, to be arranged on the slotted guiding member.

Alternatively or additionally, the pivot device may have a rotary drive by means of which the connection element of the at least one movement apparatus can be rotated, preferably about the pivot axis and/or when a rotation axis of the rotary drive is orientated with the pivot axis (for example, in alignment). The holder and the object retained can thus be pivoted in a simple manner, whilst the movement apparatus is stationary.

In another variant, the pivot device and the holder are arranged at the same (for example, transverse) side with respect to the base member. Alternatively, the pivot device, on the one hand, and the holder, on the other hand, may be arranged at different, preferably opposing (for example, transverse), sides with respect to the base member. This enables, for example, consideration to be given to different structural circumstances and requirements and the pivot device to be arranged accordingly.

In one embodiment, the apparatus has a support device which is constructed to support the object, preferably during a pivoting about the pivot axis. Advantageously, the support device is constructed separately from the holder. This enables the object to be retained, supported and stabilised both by the holder of the movement apparatus and by the support apparatus during pivoting. The load on the holder can thus be reduced.

In a development, the at least one movement apparatus has the support apparatus. Alternatively, the pivot device has the support device.

In one embodiment, the holder is a container neck holder (for example, an advantageously pretensioned holder) and the support apparatus is a container body support device and/or a container base support device. Consequently, the container can be securely supported on the rear or the base during pivoting.

In particular, the holder may have a container neck holder for a so-called neck handling.

In another embodiment, the support apparatus can preferably be moved in a translational manner and/or transversely relative to the guide path and/or by means of a linear drive in order to move into contact and out of contact with the object retained by the holder. Consequently, the support device is, for example, enabled to move into engagement with the object only when this is desirable, for example, from shortly before until shortly after a pivoting of the holder and the object.

In one embodiment, the support apparatus can be pivoted by the pivot device, preferably about a rotation axis of the pivot device and/or the pivot axis. Consequently, the object can be supported particularly well by the support device during pivoting since the abutment faces of the support apparatus carry out the same pivot movements as the object.

In another embodiment, the at least one movement apparatus has a locking apparatus. For example, the locking apparatus may be constructed to lock the pivot axis and/or the holder (for example, directly or indirectly) in a pivoted-out position and/or in a basic position (for example, pivoted-in position), preferably by means of magnetic force, a locking apparatus or a resiliently pretensioned locking member. Consequently, an undesirable lifting or pivoting of the holder, for example, during acceleration or deceleration of the movement apparatus, can be prevented.

In a variant, the at least one movement apparatus can be individually driven by means of a long stator linear motor or a short stator linear motor. For example, the base member may have one or more (for example, electric or permanent) magnets which can magnetically interact with one or more (for example, electric or permanent) magnets which can extend parallel with the guide path in order to move away the at least one movement apparatus.

In another variant, the apparatus further has an additional pivot device which is arranged separately from the at least one movement apparatus and which is constructed to pivot the holder about the pivot axis. The pivot device may be configured to pivot out the holder, and the additional pivot device may be configured to pivot in the pivoted-out holder. Between the pivot device and the additional pivot device, a processing apparatus (for example, rinsing apparatus or container blowing apparatus) which may require a pivoted-out holder with a correspondingly orientated object may, for example, be arranged. Alternatively, the pivot device and the additional pivot device may be arranged to simultaneously pivot the holders of two different, preferably sequential, movement apparatuses. Two objects (or more in the case of additional pivot devices) can thus be processed at the same time, which enables increased productivity.

In one embodiment, the apparatus is constructed as a rinsing apparatus for rinsing containers.

In another embodiment, the apparatus is constructed as a mixing apparatus for mixing different media in a container. The mixing can be achieved by single or multiple pivoting of the object which is in the form of a container.

In another embodiment, the apparatus is constructed as a transport apparatus for transporting preforms (plastics material blanks) through a blowing machine furnace. The preforms may, for example, be taken from a preform sorting and, for example, be pivoted into an inverted state by means of a pivot device. Subsequently, the preforms can be heated in an inverted state and blown in an inverted state to form containers (for example, bottles). Immediately afterwards, a rinsing of the container can be carried out before the container is then subsequently turned or pivoted into the normal state again, for example, by means of a pivot device.

Advantageously, the base member carries one or more guiding elements, for example, guiding pins, sliding blocks, rotatable rollers, etcetera, by means of which the base member can be guided along the guide path.

As used in this instance, the term "pivoting" may preferably also be intended to be understood to be a rotation, for example, when the object is retained, for example, precisely at the centre thereof by means of the retention apparatus.

Preferably, the pivot axis may be orientated perpendicularly to the transport direction of the at least one movement apparatus and horizontally. It is also possible for the pivot axis to be orientated, for example, parallel with the transport direction of the at least one movement apparatus so that, for example, during the pivot movement, less space is required at the front and rear. It is thus also possible for movement apparatuses to be able to move much closer together and consequently a small division can be achieved. This can increase a throughput in the apparatus for transporting.

Preferably, the objects when pivoted relative to the base member can move at least temporarily in or counter to a transport direction of the at least one movement apparatus.

It is possible, in the case of the pivot axis which is orientated parallel with the transport direction, for an object to be arranged prior to pivoting when viewed in the transport direction to the right of the base member and after the pivoting to the left. This may, for example, be the case when the pivot axis is arranged close to the base member.

It is also possible with the pivot axis which is orientated parallel with the transport direction for the pivot axis to be arranged further away from the base member and in particular close to the holder, wherein the holder has a degree of spacing from the base member so that the objects are arranged before and after the pivoting at the same side of the base member. In this instance, it may be advantageous for the portion of the object located furthest away from the pivot axis to be pivoted away from the base member at the beginning of a pivot movement.

It would also be conceivable to arrange the pivot axis through a centre of the holder in order, for example to keep the spacing between the base member and the holder small.

The invention also relates to a container processing installation (for example, for producing, cleaning, checking, filling, closing, labelling, printing and/or packaging containers for liquid media, preferably drinks or liquid foodstuffs). The container processing installation has a plurality of container processing apparatuses and an apparatus for transporting objects, as disclosed herein. Preferably, the pivot device may be integrated in one of the plurality of container processing apparatuses. Alternatively, for example, the pivot device may be arranged with respect to a container flow between two sequential container processing apparatuses, wherein preferably another pivot device is arranged downstream of the two sequential container processing apparatuses. The container processing installation enables the same advantages to be afforded as already disclosed herein for the apparatus for transporting objects.

The invention also relates to a method for transporting objects, preferably containers for a container processing installation, by means of at least one movement apparatus. It is possible for the method to use the apparatus for transporting objects as disclosed herein. The method has an individual driving (for example, by means of a long stator linear motor or short stator linear motor) and guiding of a base member of the at least one movement apparatus along a guide path. The method involves retention of an object by means of a holder of the at least one movement apparatus. Advantageously, the holder may be pivotably connected to the base member. The method further involves pivoting of the holder together with the object retained about a pivot axis which is orientated in an angled manner with respect to an upright axis of the at least one movement apparatus, relative to the base member by means of a pivot device which is arranged separately from the at least one movement apparatus. The method may have the same advantages as the apparatus disclosed herein.

In one embodiment, the object is a container (for example, drinks container) which has an opening (for example, pouring opening).

In another embodiment, the method further involves flushing out or cleaning the container with a liquid in an orientation of the container, in which the opening is directed substantially downwards (for example, longitudinal axis of the container at an angle of 120° to 180° relative to the vertical), wherein the pivoting pivots the container into the orientation and/or pivots it out of the orientation into another orientation in which the opening is directed substantially upwards, (for example, longitudinal axis of the container at an angle of from 120° to 180° relative to the vertical). It is possible for the method to involve filling the container after cleaning or flushing out.

In another embodiment, the method involves mixing different media in the container by means of pivoting. Preferably, the mixing or pivoting can be carried out after the container has been filled with different media and/or after the container has been closed.

The preferred embodiments and features of the invention described above can be freely combined with each other.

BRIEF DESCRIPTION OF THE FIGURES

Other details and advantages of the invention will be described below with reference to the appended drawings, in which.

Figure 1:
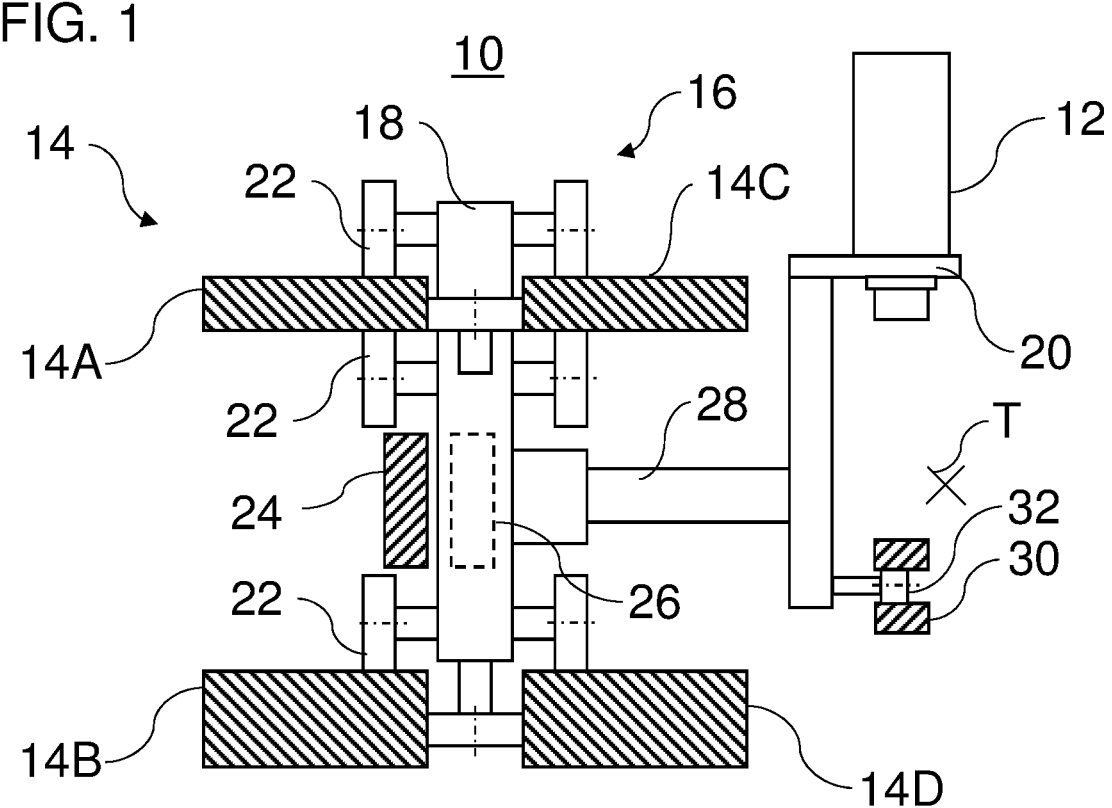
FIG. 1 is a schematic cross section through an apparatus for transporting containers according to an embodiment of the present disclosure, having a container pivoted into an inverted state.

The embodiments shown in the Figures at least partially correspond to each other so that similar or identical components are given the same reference numerals and, for the explanation thereof, reference may also be made to the description of the other embodiments or Figures in order to avoid repetition.

DETAILED DESCRIPTION OF EXEMPLARY EMBODIMENTS

Figure 2:
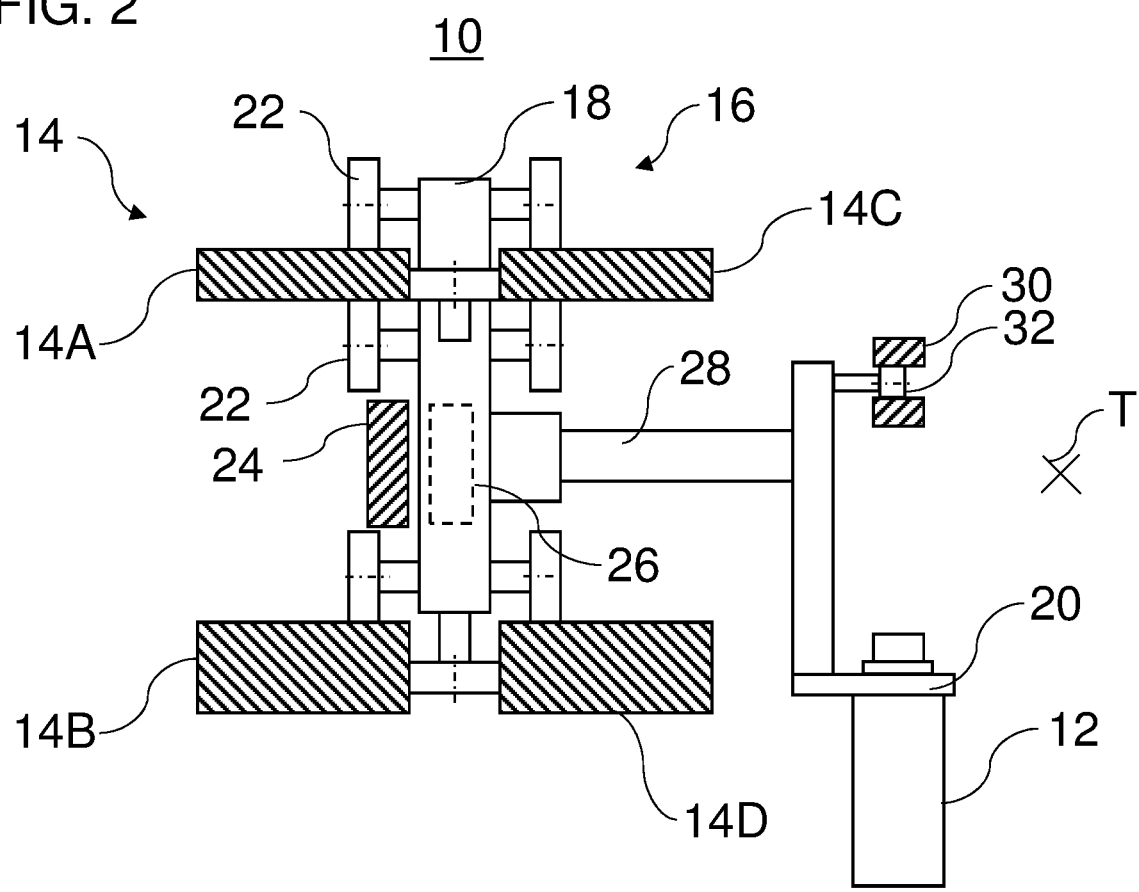
FIG. 2 is a schematic cross section through the exemplary apparatus of FIG. 1.

FIGS. 1 and 2 show purely schematically an apparatus 10 for transporting objects. The objects can be transported by means of the apparatus 10 in a transport direction T (see arrow in the Figures). In the embodiment illustrated, the apparatus 10 transports a container 12. It is also possible for the apparatus 10 to be configured for transporting other objects.

The apparatus 10 has a guide path 14 and one or more movement apparatuses 16. For reasons of clarity, only one movement apparatus 16 is illustrated in FIGS. 1 and 2. The movement apparatus 16 is guided along the guide path 14.

A longitudinal extent direction of the guide path 14 determines the transport direction T. The guide path 14 may have a plurality of guide path segments which extend in parallel, for example, four guide path segments 14A-14D, as illustrated. It is also possible for more or fewer guide path segments to be included, for example, only two. The guide path segments 14A-14D extend at both sides, that is to say, at both transverse sides, of the movement apparatus 16. However, it is also possible for one or more guide path segments to extend only at a (transverse) side of the movement apparatus 16. The guide path segments 14A—14D may, for example, be configured as rails, grooves, runways or the like.

Advantageously, the guide path 14 may be a closed, for example, annular guide path. The movement apparatus 16 can circulate or travel along the closed guide path 14 and in this instance, for example, pass various processing apparatuses.

The movement apparatus 16 has a base member 18 and a holder 20.

The base member 18 is guided and supported on the guide path segments 14A—14D of the guide path 14 by means of a plurality of guiding elements 22. In the embodiment illustrated, the movement apparatus 16 has a total of eight guiding elements 22, of which in the Figures for reasons of clarity only a few are given a reference numeral. It is possible for the movement apparatus(es) 16 to have more or fewer guiding elements and/or for the guiding elements to have an arrangement different from the one illustrated.

The guiding elements 22 are configured as rotatable rollers which can roll on the guide path segments 14A-14D which are in the form of a runway. It is also possible for the guiding elements to be configured differently, for example, as sliding blocks, guiding pins, etcetera.

The movement apparatus 16 is driven by means of a long stator 24. The long stator 24 extends parallel with the guide path 14 in the transport direction T. The long stator 24 may be formed in the transport direction T from a plurality of long stator segments which are connected to each other. The base member 18 has at least one magnet 26. The at least one magnet 26 may be configured as an electromagnet or as a permanent magnet. The long stator segments of the long stator 24 may magnetically interact with the at least one magnet 26 of the movement apparatus 16. The long stator 24 and the magnets 26 thus form a so-called long stator linear motor. As a result of the magnetic interaction, the movement apparatus 16 can be moved in the transport direction T. In detail, each movement apparatus 16 can be moved alone and individually by the long stator 24 along the guide path 14 in the transport direction T (or in the opposite direction).

Even if the drive by means of a long stator linear motor is particularly preferred, it has been recognised that the techniques disclosed herein can also be used with other drive concepts. It is consequently, for example, also possible to individually drive or move away the movement apparatuses 16 using another driving technique. For example, each of the movement apparatuses 16 may have an individual advantageously electrical drive unit by means of which, for example, wheels or rollers of the movement apparatuses 16 can be driven along the guide path 14.

The holder 20 is configured to retain the container 12. The holder 20 may, for example be configured as an advantageously pretensioned holder, as a mandrel or as an actuatable gripper. The holder 20 retains and carries the container 12 at a container neck of the container 12, preferably below a neck ring of the container 12. The container 12 is releasably retained by means of the holder 20. It is also possible for the holder 20 to retain the container 12 at another location, for example, at the container body. In other embodiments, the holder 20 may also be configured differently in order, for example, to retain other objects with other shapes.

The apparatus 10 is capable of pivoting the holder 20 and consequently the container 12, in particular into an inverted state. To this end, the apparatus 10 advantageously has a pivot axis 28 and a pivot device 30.

The holder 20 is pivotably (rotatably) connected to the base member 18 by means of the pivot axis 28. The pivot axis 28 may be rotatably supported in a rotary bearing on the base member 18. The pivot axis 28 can advantageously be orientated in any orientation which enables the holder 20 and consequently the container 12 to be pivoted into an inverted state. Advantageously, consequently, the pivot axis 28 may have any orientation which is angled with respect to an upright axis of the movement apparatus 16. For example, the pivot axis 28 may be orientated horizontally and transversely with respect to the transport direction T, as illustrated in the Figures. However, it is also possible for the pivot axis 28 to extend parallel with the transport direction T. It is also possible for the pivot axis 28 not to extend horizontally but instead at an angle relative thereto.

The pivot device 30 is arranged externally in a fixed manner with respect to the movement apparatus 16 on a path portion of the guide path 14. The pivot device 30 may bring about a pivoting of the holder 20 about the pivot axis 28. The pivot device 30 can be connected or coupled to the movement apparatus 16. In detail, a connection element 32 of the movement apparatus 16 can be connected to the pivot device 30 when the movement apparatus 16 passes the pivot device 30 or stops at the pivot device 30. The connection element 32 may be secured to the holder 20 and/or to the pivot axis 28.

Figure 3:
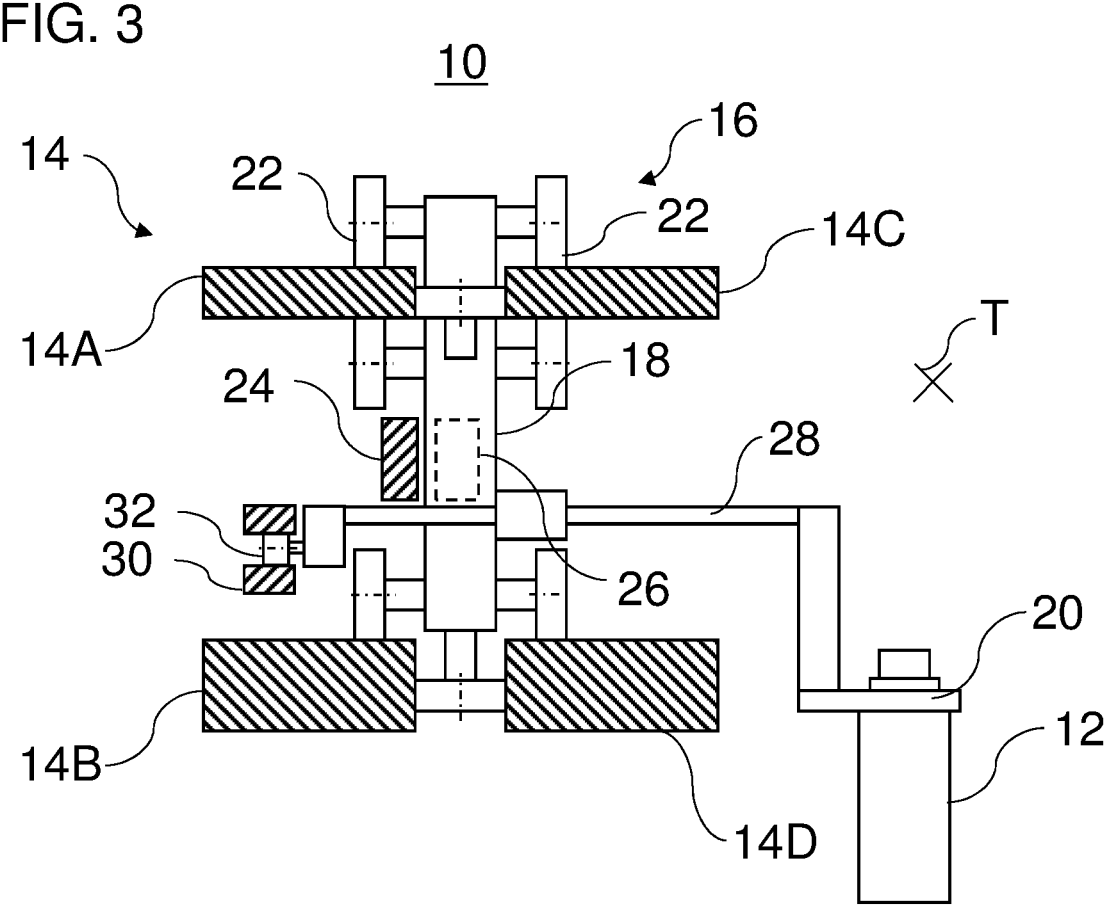
FIG. 3 is a schematic cross section through an apparatus for transporting containers according to another embodiment of the present disclosure.

In FIGS. 1 to 3, the pivot device 30 is constructed as a slotted guiding member. The slotted guiding member guides the connection element 32 which is configured, for example, as a rotatable roller. The slotted guiding member is formed in such a manner that it brings about a relative height change of the connection element 32 with respect to the base member 18 when the movement apparatus 16 moves away along the guide path 14 and the pivot device 30. The relative height change is converted via the pivot axis 28 into a pivot movement of the holder 20 so that the container 12 retained by the holder 20 can be pivoted about the pivot axis 28. Since the connection element 32 is also pivotably carried on the base member 18 by means of the pivot axis 28, the connection element 32 in the same manner as the holder 20 carries out a pivot movement about the pivot axis 28 during the relative height change.

FIGS. 1 and 2 show how the holder 20 and the container 12 are pivoted into an inverted state by means of the pivot device 30 while the movement apparatus 16 moves away.

In the embodiment shown according to FIGS. 1 and 2, it is preferable for the holder 20 to always be arranged at least slightly offset in or counter to the transport direction relative to the guiding element 22 in order to provide a lever for the force which the slotted guiding member applies to the connection element 32—when viewed relative to the pivot axis 28. If a vertical position of the object 12 is intended to be achieved, the holder 20 can be arranged on the lever relative to the non-positioned lever between the holder 20 and connection element in a state rotated about a parallel with respect to the pivot axis 28. Alternatively (not illustrated), it would be possible in order to initiate the pivoting or rotational movement to arrange a stationary friction liner which touches the lever, the holder 20 or the connection element 32 when passing and thereby brings about the pivoting or the rotational movement. The same applies to FIG. 3.

It is possible for the connection element 32 to be configured differently, for example, in a contactless manner in the form of a magnet or in a contacting manner in the form of a sliding block, a guiding pin or a guiding plate.

It is also possible for the pivot device 30 to have a rotary drive. The rotary drive can be connected to the connection element 32 in order to rotate the connection element 32 and consequently the holder 20 and the container 12. Advantageously, the movement apparatus 16 is stationary in this instance and a rotation axis of the rotary drive is in alignment with the pivot axis 28. The rotary drive may, for example be driven electrically, pneumatically or hydraulically.

The apparatus 10 consequently enables the container 12 to be able to be pivoted without it having to be transferred or removed from the movement apparatus 16 for this purpose. The pivoting into an inverted state can particularly advantageously be used in container processing installations since some container processing apparatuses may require the container 12 to be processed in the inverted state.

For example, a blowing apparatus for producing containers may blow the containers 12 in an inverted state from a plastics material blank (preform). A rinsing apparatus can rinse (flush) the containers 12 in an inverted position in order to ensure that the rinsing fluid sprayed into the containers 12 (for example, water, sterile water, etcetera) leaves the containers 12 again by itself. Other processing apparatuses of the container processing installation, such as, for example, a container filler or a container closer, may in turn require an upright orientation of the containers 12. The apparatus 10 can consequently be used to ensure the different desired orientations for the container processing apparatuses. For example, the container 12 can thus first be produced and rinsed in an inverted state and subsequently filled and closed in an upright state. It is also possible for a container to be intended to be provided with a sheath or a sleeve. The fitting or placement of the sleeve on the container 12 can be carried out when the container 12 is in an inverted position. The sleeve can consequently, for example, also cover a base of the container 12. In addition to the arrangement between container processing apparatuses, it is also conceivable for the apparatus 10 itself to be integrated in a container processing apparatus. For example, the apparatus 10 may act as a mixing apparatus in which a plurality of media which are introduced into the container 12 (for example, water, syrup, flavourings and/or cereals) are mixed together by pivoting the container 12, advantageously after the container 12 has already been closed. The apparatus 10 may, for example, also be integrated in a container blowing apparatus or in a rinsing apparatus.

In the embodiment of FIGS. 1 and 2, the holder 20, the pivot device 30 and the connection element 32 are all arranged at the same (transverse) side of the movement apparatus 16. However, for example, it is also possible for the pivot device 30 and the connection element 32, on the one hand, and the holder 20 with the container 12, on the other hand, to be arranged at different sides, in particular opposing transverse sides, of the movement apparatus 16, as illustrated by way of example in FIG. 3. For example, the pivot axis 28 may extend through the base member 18. The connection element 32 and the holder 20 may be fitted at opposing ends of the pivot axis 28.

Figure 6:
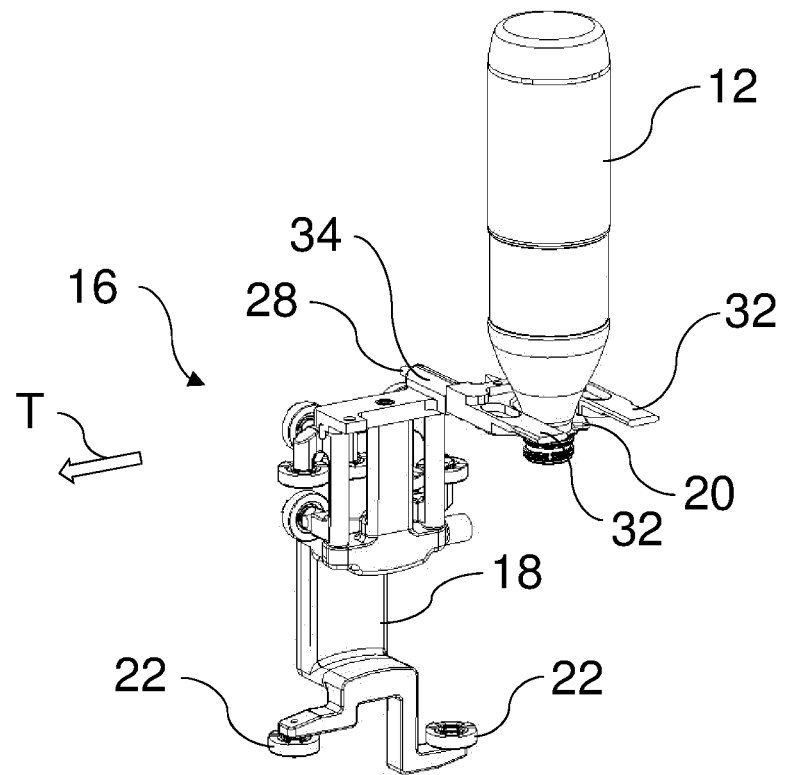
FIG. 6 is a perspective front view of the exemplary movement apparatus of FIG. 5 with the holder pivoted out.
Figure 7:
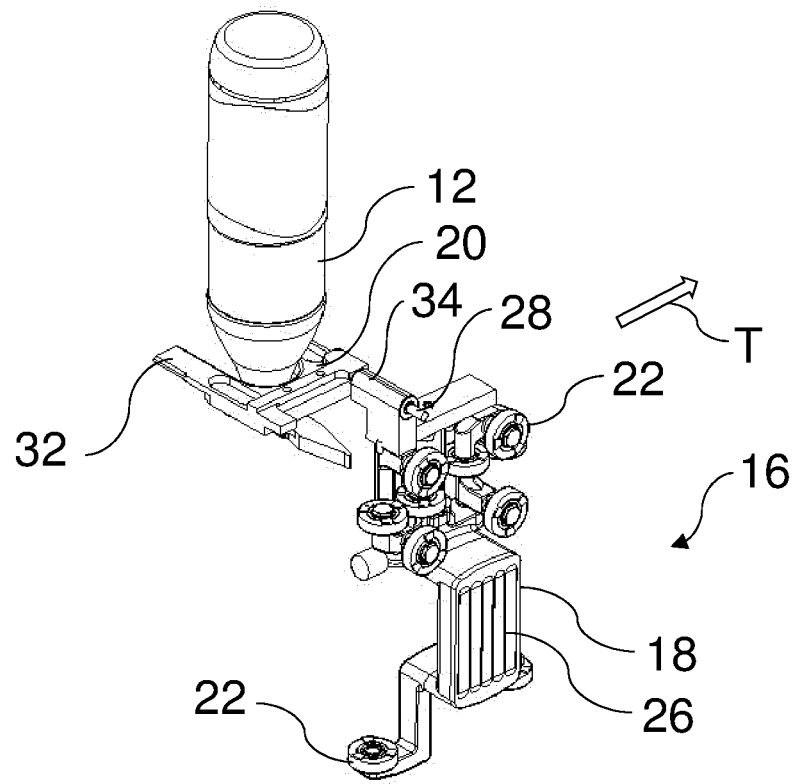
FIG. 7 is a perspective rear view of the exemplary movement apparatus of FIG. 4 with the holder pivoted out.
Figure 8:
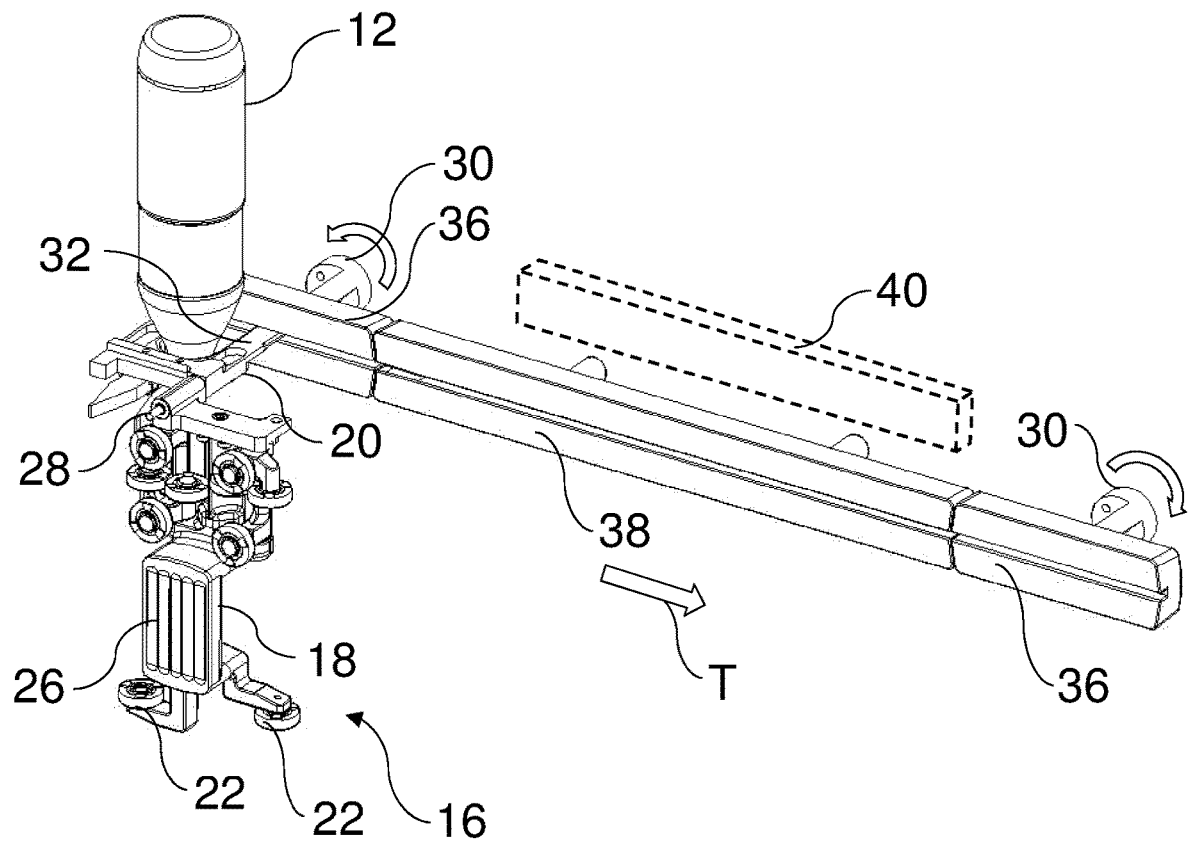
FIG. 8 is a perspective view of an apparatus for transporting containers according to an embodiment of the present disclosure.
Figure 9:
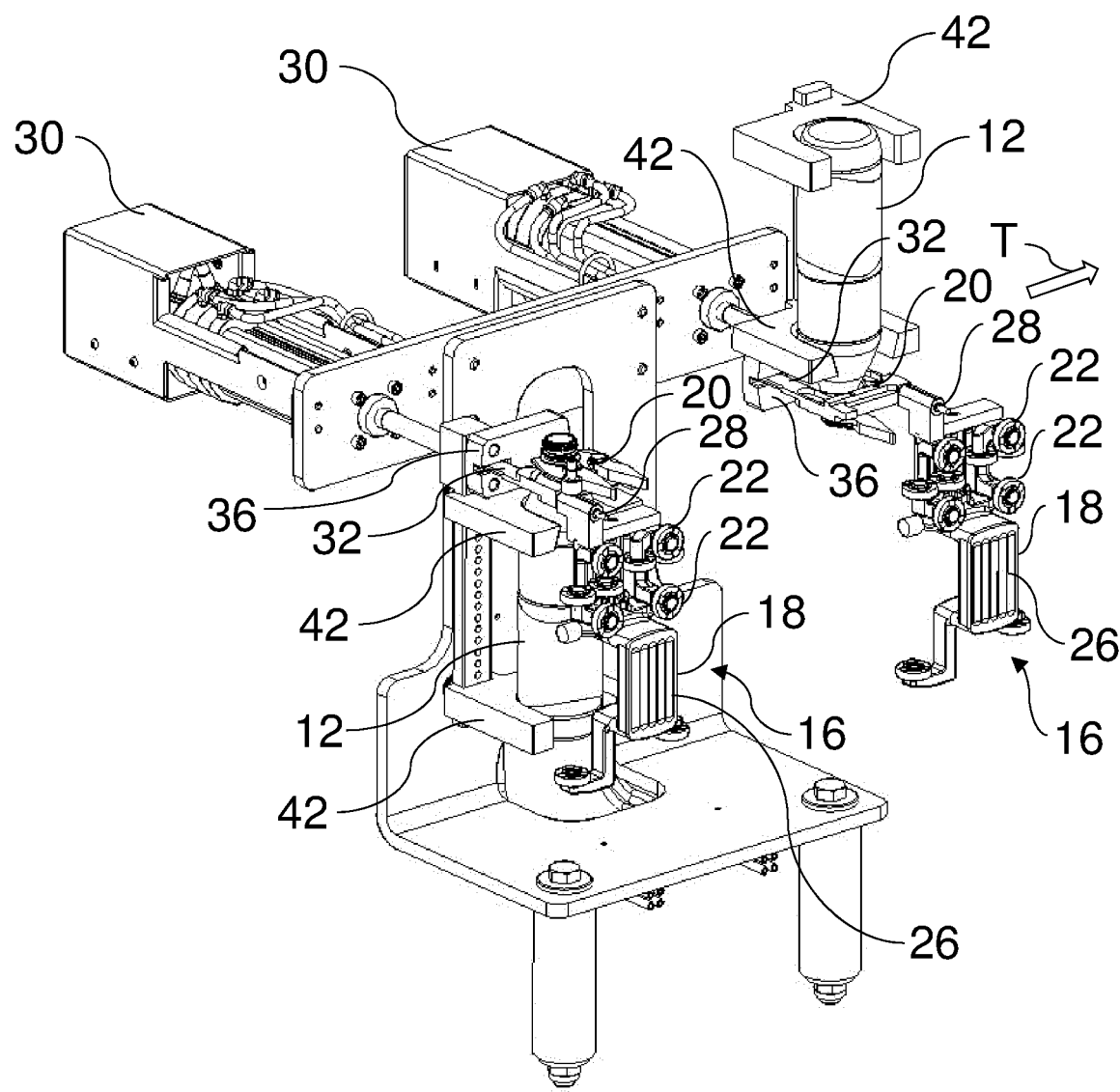
FIG. 9 is a perspective front view of an apparatus for transporting containers according to an embodiment of the present disclosure.
Figure 10:
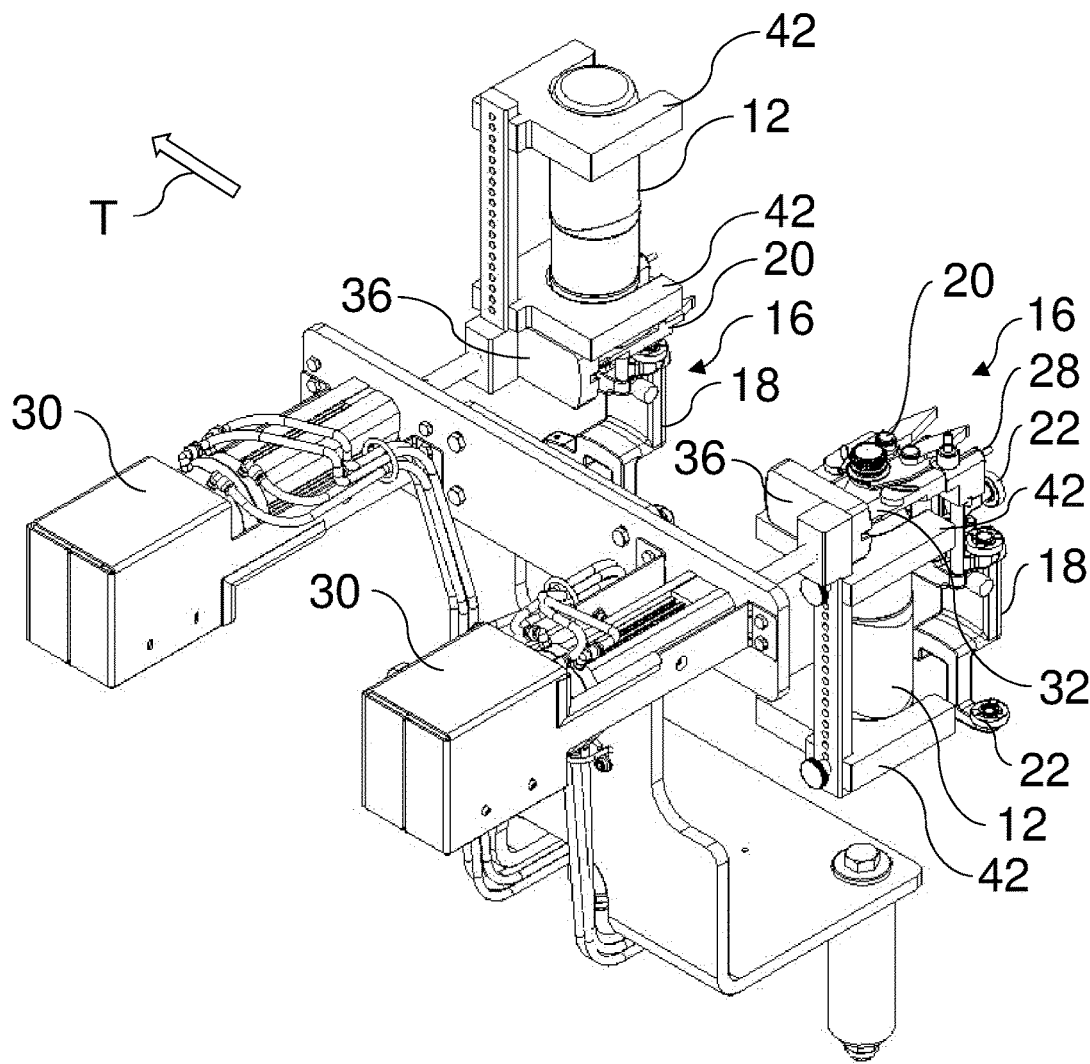
FIG. 10 is a perspective rear view of the exemplary apparatus of FIG. 9.

FIGS. 4 to 7 show an alternative embodiment of the movement apparatus 16, which can be used in particular with the apparatuses of FIGS. 8 to 10. For reasons of clarity, no guide paths and no long stator are illustrated in FIGS. 4 to 10.

Figure 4:
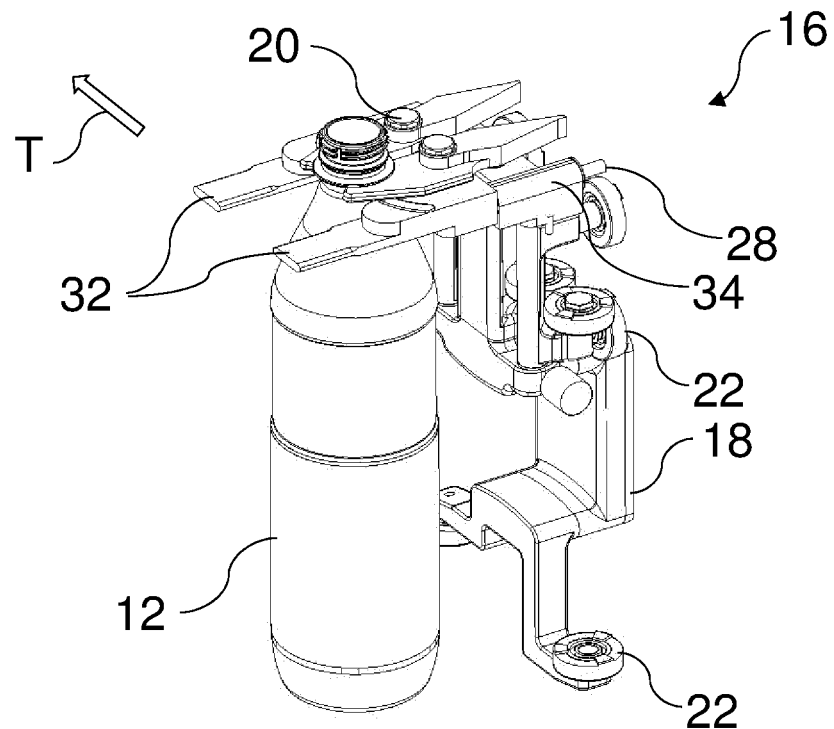
FIG. 4 is a perspective front view of a movement apparatus according to an embodiment of the present disclosure with a pivoted-in holder.
Figure 5:
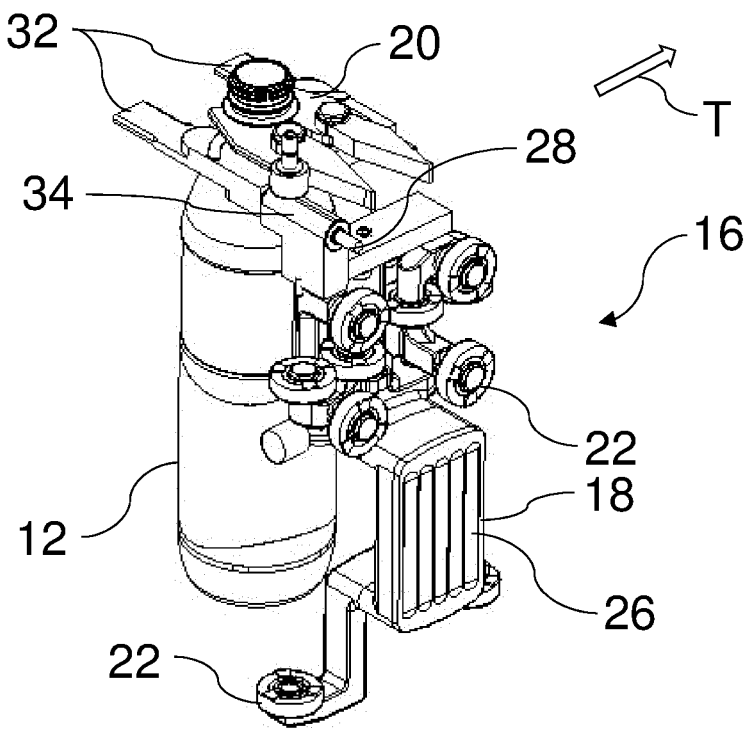
FIG. 5 is a perspective rear view of the exemplary movement apparatus of FIG. 4 with a pivoted-in holder.

FIGS. 4 to 7 show the movement apparatus 16, in which the pivot axis 28 is arranged on an upper side of the base member 18. The holder 20 may be pivoted between a basic position or pivoted-in position and a pivoted-out position. A pivot angle between the basic position and the pivoted-out position may advantageously be 180°. In principle, however, any pivot angle from 1° to 360° is conceivable. FIGS. 4 and 5 show the holder 20 in the basic position. FIGS. 6 and 7 show the holder 20 in the pivoted-out position.

The connection element 32 of the movement apparatus 16 of FIGS. 4 to 7 has at the front end thereof regions which are preferably flattened at both sides or two flattened guiding plates. The holder 20 is preferably directly secured to the connection element 32. The holder 20 is configured as an advantageously pretensioned holder which releasably retains or carries the container 12 below the neck ring.

Generally, the movement apparatus 16 may have a locking apparatus 34 (indicated only schematically in FIGS. 4 to 7). The locking apparatus 34 can lock the holder 20 and/or the pivot axis 28 in one or more desired positions. For example, the locking apparatus 34 can lock the holder 20 of the movement apparatus 16 of FIGS. 4 to 7 in the basic position and/or pivoted-out position.

Alternatively, for example, a lockable locking action is also conceivable. This locking could then be released prior to the pivoting operation.

The locking apparatus 34 may, for example, be configured by means of one or more magnets which are not illustrated in greater detail, a latching apparatus which is not illustrated in greater detail or a resiliently pretensioned locking member or the like which is not illustrated in greater detail. The locking apparatus 34 can prevent the holder 20 from being moved in a non-desirable manner from the locked position in each case, for example, as a result of an acceleration or deceleration of the movement apparatus 16. During pivoting, the respective pivot device 30 (not illustrated in FIGS. 4 to 7) first has to overcome the locking force brought about by the locking apparatus 34 in order to pivot the holder 20 from the locked position in each case.

FIG. 8 shows an embodiment of the apparatus 10.

FIG. 8 shows that the pivot device 30 has a rotary drive. The connection element 32 of the movement apparatus 16 may be connected to a connection element 36 of the pivot device 30. The connection element 36 may, for example be in the form of a rail, a groove, a slotted guiding member, a receiving member, etcetera, or a pin or the like. The connection element 36 can be rotated by the rotary drive. The movement apparatus 16 is stationary in this instance. As a result of the rotation of the rotary drive, the connection elements 32, 36 and the holder 20 can be pivoted into the pivoted-out position, as illustrated on the left in FIG. 8. Advantageously, a rotation axis of the rotary drive is in alignment with the pivot axis 28 in this instance.

After the pivoting into the pivoted-out position, the movement apparatus 16 can be moved further in the transport direction T. The holder 20 is in this instance, for example, by means of a stationary guiding element 38, for example, a groove or a rail, held in the pivoted-out position. Alternatively or additionally, during the movement, the holder 20 could also be retained in the pivoted-out position by the locking apparatus 34 mentioned above (see FIGS. 4 to 7).

After the pivoting into the pivoted-out position, the movement apparatus 16 can be processed by a processing apparatus 40 (indicated only schematically in FIG. 8) during travel or whilst stationary. For example, the processing apparatus 40 may be a rinsing apparatus with rinsing valves which spray a rinsing fluid from below into the container 12.

After being processed in the processing apparatus 40, the holder 20 can be pivoted back into the basic position again by means of another pivot device 30, if desired. The pivot device 30 (left side in FIG. 8) can consequently be used to pivot the holder 20 into the pivoted-out position, whilst the additional pivot device 30 (right side in FIG. 8) can be used to pivot the holder 20 of the same movement apparatus 16 back into the basic position again.

FIGS. 9 and 10 show a mixing apparatus, in which the apparatus 10 is integrated. The mixing apparatus serves to mix media in the containers 12. In the embodiment illustrated, the mixing apparatus has two mixing stations each with a pivot device 30 for simultaneously pivoting two containers 12. Consequently, two containers 12 can always be processed at the same time, whereby a throughput can be increased.

The media in the containers 12 are mixed by the containers being overturned or turned upside down multiple times. The apparatus 10 serves in this instance to pivot the containers 12. A mixing operation can also be carried out by the container 12 being moved back and forth in the pivot direction by the mixing apparatus or pivot device 30. This can be carried out both in an upright position or in an inverted position. Consequently, a better degree of mixing of the components in the container 12 can be achieved, if required.

As shown by way of example in FIGS. 9 and 10, the apparatus 10 may have a support apparatus 42 for the containers 2. The support apparatus 42 can support the containers 12 during the pivoting. The holder 20 therefore does not have to carry the entire load as a result of the filled container 12. The support apparatus 42 advantageously supports a container body and/or a container base of the container 12. A form of the support apparatus 42 may be adapted to a form of the container 12. The support apparatus 42 may support the container 12 at one or more locations or regions of the container 12. For example, the support apparatus 42 may support the container 12 at an upper region of the container body and a lower region of the container body, as illustrated. As also illustrated, the individual segments of the support apparatus 42 may be arranged so as to be able to be adjusted in terms of height and/or so as to be able to be (for example, rapidly) replaced so that, for example, a rapid conversion to different container formats can take place.

The support apparatus 42 may be part of the pivot device 30 and be pivoted together with the holder 20, as illustrated. It is also possible for the support apparatus 42 to be part of the movement apparatus 16. For example, the support apparatus 42 may be connected to the holder 20 and pivoted by the pivot axis 28.

In the embodiment illustrated, the pivot device 30 can also move the connection element 36 and/or the support apparatus 42 in translation, for example, by means of a linear motor. The translational movement can advantageously be carried out transversely relative to the transport direction T. Consequently, the connection element 36 can be moved selectively into contact or out of contact with the connection element 32 in order to enable pivoting of the container 12. The support apparatus 42 can also be selectively moved into contact or out of contact with the container 12, in order to support the container 12 only during the pivoting. In the retracted state, the connection element 36 and/or the support apparatus 42 does not block further movement of the movement apparatus 16. In addition to the translational movement of the connection element 36 and the support apparatus 42 as explained in this instance, other movement paths for the connection element 36 and/or the support apparatus 42 are also possible in order to selectively move into contact or out of contact with the connection element 36 or the container 12, for example, a pivot movement.

The invention is not limited to the preferred embodiments described above. Instead, a large number of variants and modifications which also make use of the notion of the invention and are therefore included within the protective scope are possible. In particular, the invention also claims protection for the subject-matter and the features of the dependent claims independently of the claims referred to. In particular, the individual features of the independent claim 1 are disclosed independently of each other. In addition, the features of the dependent claims are also disclosed independently of all the features of the independent claim 1 and, for example, independently of the features relating to the presence and/or the configuration of the guide path, the at least one movement apparatus and/or the pivot device of the independent claim 1. All range indications therein are intended to be understood to be disclosed in such a manner that so to speak all the values which fall within the respective range are individually disclosed, for example, also as preferred narrow outer limits of the respective range.

LIST OF REFERENCE NUMERALS

- 10 Apparatus for transporting objects
- 12 Container
- 14 Guide path
- 14A Guide path segment
- 14B Guide path segment
- 14C Guide path segment
- 14D Guide path segment
- 16 Movement apparatus
- 18 Base member
- 20 Holder
- 22 Guiding element
- 24 Long stator
- 26 Magnet(s)
- 28 Pivot axis
- 30 Pivot device
- 32 Connection element
- 34 Locking apparatus
- 36 Connection element
- 38 Stationary guiding element
- 40 Processing apparatus
- 42 Support apparatus
- T Transport direction

What is claimed is:

1. An apparatus for transporting objects for a container processing installation, comprising:
   a guide path;
   at least one movement apparatus having:
   a base member which is guided along the guide path and which can be individually driven, and
   a holder for retaining an object, wherein the holder is connected to the base member so as to be able to be pivoted about a pivot axis and the pivot axis is orientated so as to be angled with respect to an upright axis of the at least one movement apparatus; and
   a pivot device which is arranged separately from the at least one movement apparatus and which is constructed to bring about a pivoting of the holder about the pivot axis,
   wherein;
   the at least one movement apparatus has a connection element which is connectable to the pivot device and which is connected to the holder, wherein the connection element is constructed to bring about a pivot movement of the holder under the action of the pivot device,
   wherein at least one of:
   a connection element of the pivot device, which is connectable to the connection element of the at least one movement apparatus, is movable in order to move into contact and out of contact with the connection element of the at least one movement apparatus, and
   the pivot device has a rotary drive via which the connection element of the at least one movement apparatus is rotatable.

2. The apparatus according to claim 1, wherein at least one of:
   the pivot axis is orientated in such a manner that the object which is retained in the holder is pivotable into an inverted state;
   the pivot axis is constructed to pivot the holder at a pivot angle in the range between 1° and 360°; and
   the holder is pivotable about the pivot axis between a basic position and a pivoted-out position.

3. The apparatus according to claim 1, wherein at least one of:
   the pivot device is fixed with respect to the guide path; and
   the pivot device is constructed to pivot the holder during a stoppage of the respective movement apparatus or during a movement of the respective movement apparatus along the guide path.

4. The apparatus according to claim 1, wherein the object is a container.

5. The apparatus according to claim 4, wherein at least one of:
   the connection element of the at least one movement apparatus is pivotable about the pivot axis of the holder; and
   the connection element of the at least one movement apparatus is in the form of a guiding element including one of a rotatable roller, a sliding block, a guiding pin, a guiding plate and a guiding groove.

6. The apparatus according to claim 1, wherein:
   the pivot device has a slotted guiding member, in which the connection element of the at least one movement apparatus is guidable and whose progressive form brings about a pivoting of the connection element of the at least one movement apparatus.

7. The apparatus according to claim 1, wherein:
   the pivot device and the holder are arranged at the same side with respect to the base member.

8. The apparatus according to claim 1, wherein the pivot device and the holder are arranged at different sides with respect to the base member.

9. The apparatus according to claim 1, wherein at least one of:
- the at least one movement apparatus has a locking apparatus, which is constructed to lock at least one of the pivot axis and the holder in at least one of a pivoted-out position and a basic position; and
- the at least one movement apparatus is individually drivable via a long stator linear motor or a short stator linear motor.

10. The apparatus according to claim 1, further having:
an additional pivot device, which is arranged separately from the at least one movement apparatus and which is constructed to pivot the holder about the pivot axis, wherein:
- the pivot device is configured to pivot out the holder and the additional pivot device is configured to pivot in the pivoted-out holder.

11. The apparatus according to claim 1, further having:
an additional pivot device, which is arranged separately from the at least one movement apparatus and which is constructed to pivot the holder about the pivot axis, and
wherein the pivot device and the additional pivot device are arranged for simultaneously pivoting the holders of two different movement apparatuses.

12. The apparatus according to claim 1, wherein:
the apparatus is constructed as a rinsing apparatus for rinsing containers.

13. An apparatus for transporting objects for a container processing installation, comprising:
a guide path;
at least one movement apparatus having:
- a base member which is guided along the guide path and which can be individually driven, and
- a holder for retaining an object, wherein the holder is connected to the base member so as to be able to be pivoted about a pivot axis and the pivot axis is orientated so as to be angled with respect to an upright axis of the at least one movement apparatus; and
a pivot device which is arranged separately from the at least one movement apparatus and which is constructed to bring about a pivoting of the holder about the pivot axis, wherein:
the apparatus is constructed as a mixing apparatus for mixing different media in a container.

14. A container processing installation having
a plurality of container processing apparatuses; and
an apparatus according to claim 1,
wherein:
the pivot device is integrated in one of the plurality of container processing apparatuses.

15. A container processing installation having
a plurality of container processing apparatuses; and
an apparatus according to claim 1,
wherein:
the pivot device is arranged with respect to a container flow between two sequential container processing apparatuses, wherein another pivot device is arranged downstream of the two sequential container processing apparatuses.

16. An apparatus for transporting objects for a container processing installation, comprising:
a guide path;
at least one movement apparatus having:
- a base member which is guided along the guide path and which can be individually driven, and
- a holder for retaining an object, wherein the holder is connected to the base member so as to be able to be pivoted about a pivot axis and the pivot axis is orientated so as to be angled with respect to an upright axis of the at least one movement apparatus; and
a pivot device which is arranged separately from the at least one movement apparatus and which is constructed to bring about a pivoting of the holder about the pivot axis, the apparatus further having a support apparatus which is constructed to support the object during the pivoting about the pivot axis.

17. The apparatus according to claim 16, wherein at least one of:
- the at least one movement apparatus has the support apparatus or the pivot device has the support device;
- the holder is a container neck holder and the support apparatus is a container body support device or a container base support device;
- the support apparatus is movable into contact and out of contact with the object retained by the holder; and
- the support apparatus is pivotable by the pivot device.

18. A method for transporting objects for a container processing installation, via at least one movement apparatus, comprising:
individually driving and guiding a base member of the at least one movement apparatus along the guide path;
retaining an object via a holder of the at least one movement apparatus; and
pivoting the holder together with the object retained about a pivot axis which is orientated in an angled manner with respect to an upright axis of the at least one movement apparatus, relative to the base member via a pivot device which is arranged separately from the at least one movement apparatus,
wherein the object is a container which has an opening; and the method further includes mixing different media in the container by means of pivoting.

19. The method according to claim 18, wherein the object is a container which has an opening, wherein the method further involves:
flushing out or cleaning the container with a liquid in an orientation of the container in which the opening is directed substantially downwards, wherein the pivoting pivots the container into the orientation and/or out of the orientation into another orientation in which the opening is directed substantially upwards.

* * * * *